UNITED STATES PATENT OFFICE 2,136,173

STABLE PREPARATIONS OF AROMATIC COMPOUNDS CONTAINING ACTIVE HALOGEN

Friedrich-Arnold Steingroever and Otto Josef Boser, Dresden, Germany, assignors to Chemische Fabrik von Heyden, A. G., Radebeul, near Dresden, Germany, a corporation of Germany No Drawing. Application January 19, 1935, Serial No. 2,582. In Germany January 19, 1934

13 Claims. (Cl. 167—30)

The present invention relates to stable solutions of organic substances containing active halogen.

Such substances, which contain active halogen, are especially arylsulpho-dihalogenamides, like benzol- and toluol-sulphodichloramide, benzol- and toluol-sulphobromamide, furthermore monohalogenamides and halogenimides like phthalyl-halogenimide, acetylbenzol-sulphochloramide and other substances containing the halogen but loosely fixed. Most solvents proposed heretofore, like chloroform, chlorinated eucalyptus oil or chlorinated paraffine oil, according to the description of the German Patent No. 514,576, have a destroying action on the arylsulpho-dihalogenamides upon standing. On the other side, the solutions in carbon-tetrachloride have certain disadvantages which may prevent their practical application.

Now it has been found, that low boiling point aromatic compounds chlorinated in the nucleus, so far as they have no special tendency to react with halogen like for instance the low-chlorinated phenols and amines, are not acted upon by compounds containing active halogen for a long time even when containing, besides chlorine, hydrogen which can be replaced by halogen. Compared to this, the stableness of dichloramine in aliphatic chloro-compounds, like methylene-chloride and chloroform, is extremely limited and only for carbon tetrachloride it is worth while. Over the latter, the aromatic chloro-compounds have the advantage of allowing the manufacture of preparations containing active halogen which are adapted to any special purpose of application.

In performing this invention, preference is given to aromatic hydrocarbons and the halogenated aromatic ethers, carbonic acid anhydrides and many others. Phenols and amines chlorinated in the nucleus are suitable if, like trichlorophenol, they can be converted into higher halogenated products in the cold only in the presence of catalysts or of light. Similarly the halogenated aromatic ketones and nitrocompounds are sufficiently stable in the presence of substances containing active halogen. The liquid chloroderivatives of diphenyl-ether are especially good and inert solvents for arysulpho-dihalogenamides and similar substances containing active halogen and soluble in oil. The resistance to active halogen is already shown by the monochlor-diphenyl-ether. The chlorinated diphenylethers up to 8 atoms of chlorine per molecule can be obtained as odourless, high boiling, non-poisonous liquids, which are thus advantageously distinguished from carbon tetrachloride and particularly well suited as solvents according to the present invention. They have a good dissolving power for arylsulpho-dihalogenamides and other compounds containing active halogen and soluble in oil, moreover they possess the further advantage of being manufactured in almost all degrees of viscosity. The chlorinated diphenyls may be used likewise. Thus not only thin sprayable solutions, but also ointments can be produced. Moreover it is possible to add further inert substances, like hexachlor-ethane, bolus or talcum to such ointments, thus imparting any desired consistency to them. Chlorinated diphenyl-ethers with more than 8 atoms of chlorine per molecule are solid substances in general, which may be employed as bases for dusting powders according to the German Patent No. 590,796 for dichloramides etc.

That is also the case with tetrachlorophthalic anhydride. A dusting powder containing an intimate mixture of an arylsulpho-dichloramide with such substances of relatively high melting point may be prepared by dissolving both ingredients in a suitable solvent and evaporating such solvent on the waterbath with continual stirring.

Of the substances containing active halogen, to be used according to the present invention, the arlysulpho-dihalogenamides have already been mentioned.

The following examples illustrate the new method, the parts being by weight.

*Example 1*

A 5% solution of toluolsulpho-dichloramide in monochlorodiphenylether of a boiling point of 151° C. at 12 mm, when observed for more than 3 months, kept its titre practically unchanged during this time.

*Example 2*

A solution of 5 parts of toluolsulpho-dichloramide in 95 parts of chlorinated diphenylether, containing 51% of chlorine and thus about corresponding to a pentachlorodiphenylether, represents an oil of relatively low viscosity, which during 9 months does not change its active halogen content.

Stable 10% dichloramide-solutions may be prepared likewise.

*Example 3*

By dissolving 5% of benzolsulpho-dichloramide at 80° C. in a chlorinated diphenylether of 95% chlorine, about corresponding a hepta-chloro-diphenylether, an oil is obtained, which at room temperature solidifies to form a resin which hardly flows. When kept for 5 months at 50° C. protected from light, its content of active halogen does not lessen.

Example 4

An ointment is obtained by dissolving 5 parts of benzolsulpho-dibromamide in 78 parts of hepta-chloro-diphenylether and adding 17 parts of hexachloro-ethane. The active halogen content of this ointment keeps permanently unchanged.

Example 5

Another stable ointment is obtained by dissolving 5 parts of benzolsulpho-dichloramide, 10 parts of p-dichlorobenzene and 10 parts of hexachloro-benzene in 75 parts of heptachloro-diphenylether.

Example 6

A 3% solution of chlorylphthalimide in hepta-chlorodiphenylether can be kept for months without its active halogen content lessening.

Example 7

A 5% solution of toluolsulpho-dichloramide in chlorinated diphenyl of 55–60% Cl (about penta- to hexa-chlorodiphenyl) prepared hot, solidifies to form a resin which keeps permanently stable and may be varied in its consistency by adding inert substances.

Example 8

A dusting powder containing dichloramide is obtained by heating 20 parts of solid octachloro-diphenylether (about 64% Cl with 4 parts of benzene at reflux until solution is complete, adding 1 part of toluolsulpho-dichloramide and evaporating to dryness in an open dish while stirring continually. Its strength keeps unchanged for months.

Example 9

A dichloramide dusting powder, which has proved indefinitely stable, is obtained by dissolving 10 parts of tetrachlorophthalic anhydride and 1 part of toluolsulpho-dichloramide in chlorobenzene and evaporating this solution on the waterbath while continually stirring. This dusting powder is distinguished by a special fineness and capacity of adhering to the skin.

The solutions, ointments and dusting powders, which are obtained according to the present invention, may be employed for various purposes, especially for disinfection, and have a wide field for application wherever the action of active chlorine in any substances is concerned; furthermore they are of importance for destroying $\beta$–$\beta'$-dichlorodiethylsulphide and substances of similar composition, and we lay particular claim to such use.

We claim:

1. Stable preparations comprising solutions of halogenamides in chlorinated compounds selected from the group consisting of diphenyls, diarylethers and phthalic acid anhydride.

2. Stable preparations comprising solutions of arylsulpho-dihalogenamides in chlorinated compounds selected from the group consisting of diphenyls, diarylethers and phthalic acid anhydride.

3. Stable preparations comprising solutions of arylsulpho-dihalogenamides in chlorinated diphenyl.

4. Stable preparations comprising solutions of arylsulpho-dihalogenamides in chlorinated diarylether.

5. Stable preparations comprising solutions of toluenesulpho-dihalogenamides in chlorinated diarylether.

6. Stable preparations comprising solutions of benzolsulpho-dihalogenamides in chlorinated diarylether.

7. Stable preparations comprising a solution of toluenesulpho-dichloramide in chlorinated diarylether.

8. Stable preparations comprising a solution of toluenesulpho-dichloramide in chlorinated diphenylether.

9. Stable dust-like preparations comprising solid solutions of halogenamides in highly chlorinated compounds selected from the group consisting of diphenyls, diarylethers and phthalic acid anhydride.

10. Stable unguentary preparations comprising solutions of halogenamides in chlorinated diphenyls, and hexachloroethane.

11. Stable unguentary preparations comprising solutions of halogenamides in chlorinated diarylether, and hexachloroethane.

12. Stable unguentary preparations comprising solutions of halogenamides in chlorinated diphenyls, and hexachlorobenzene.

13. Stable unguentary preparations comprising solutions of halogenamides in chlorinated diarylether, and hexachlorobenzene.

FRIEDRICH-ARNOLD STEINGROEVER.
OTTO JOSEF BOSER.